United States Patent
Huntington

(10) Patent No.: US 6,751,085 B1
(45) Date of Patent: Jun. 15, 2004

(54) SOLID STATE CAPACITORS AND METHODS OF MANUFACTURING THEM

(75) Inventor: David Huntington, Bovey Tracey (GB)

(73) Assignee: AVX Limited (GB)

( * ) Notice: Subject to any disclaimer, the term of this patent is extended or adjusted under 35 U.S.C. 154(b) by 0 days.

(21) Appl. No.: 10/030,458
(22) PCT Filed: Jul. 7, 2000
(86) PCT No.: PCT/GB00/02630
§ 371 (c)(1), (2), (4) Date: Aug. 19, 2002
(87) PCT Pub. No.: WO01/08178
PCT Pub. Date: Feb. 1, 2001

(30) Foreign Application Priority Data

Jul. 8, 1999 (GB) .............................................. 9916047
Nov. 12, 1999 (GB) .............................................. 9926894

(51) Int. Cl.$^7$ ................................................ H01G 9/00
(52) U.S. Cl. ...................... 361/523; 361/523; 361/524; 361/502; 361/512; 361/516; 29/25.03
(58) Field of Search ................................ 361/523, 524, 361/525, 528, 502, 503, 504, 508, 509, 512, 516, 518, 433; 29/25.03

(56) References Cited

U.S. PATENT DOCUMENTS 5,357,399 A    10/1994   Salisbury
5,926,363 A *  7/1999    Kuriyama ................... 361/523

FOREIGN PATENT DOCUMENTS

WO         WO0028559        5/2000

* cited by examiner

Primary Examiner—Chau N. Nguyen
Assistant Examiner—Nguyen T. Ha
(74) Attorney, Agent, or Firm—Dority & Manning, P.A.

(57) ABSTRACT

The present invention relates to the field of solid state capacitors. The invention particularly relates to capacitors of the type in which a powder-formed valve action material, typically tantalum, forms a highly porous anode body portion of a solid state capacitor. According to one aspect of the present invention there is provided a method of manufacturing a solid state capacitor including: providing an electrically conducting substrate; forming a plurality of upstanding porous electrically conducting anode bodies on a surface of the substrate, each body electrically connected to the substrate; forming an electrically insulating layer on the exposed surface area provided by the porous bodies; forming a conducting layer on the insulating layer; dividing the substrate into capacitor units, each having a portion of substrate provided with a porous capacitive body, and for each unit: providing a cathode terminal in electrical contact with the conducting layer on the capacitive body, providing an anode terminal in electrical contact with the substrate portion, characterized in that the cathode terminal is formed on a surface of the capacitive body distal to the substrate portion and the anode terminal is formed adjacent to and substantially co-planar with the cathode terminal, an electrically conductive wick providing electrical contact between the substrate portion and the anode terminal, so that the capacitors have anode and cathode terminals on a common face. By forming a capacitor with anode and cathode connections on a common face the footprint of the capacitor is minimized, whilst facilitating connection with a circuit board.

7 Claims, 11 Drawing Sheets

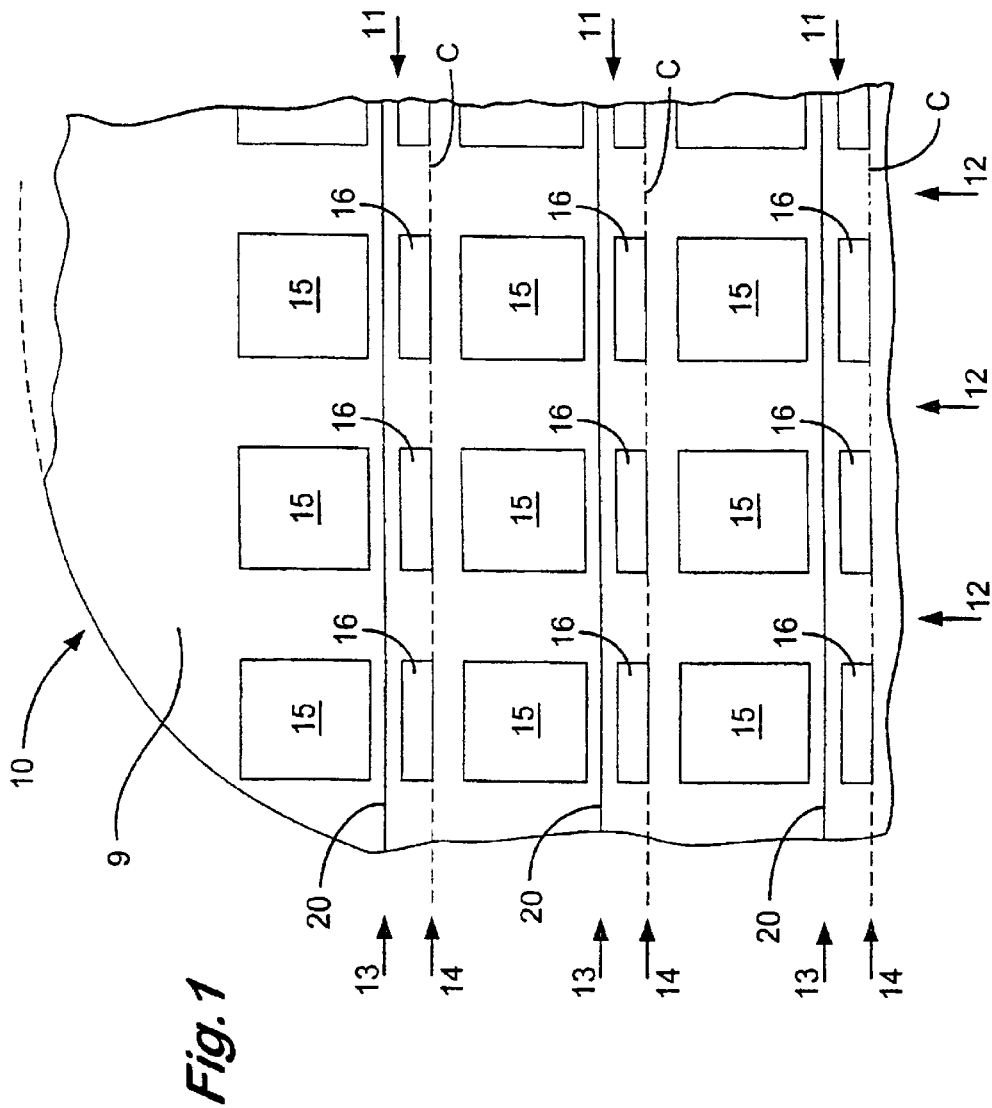

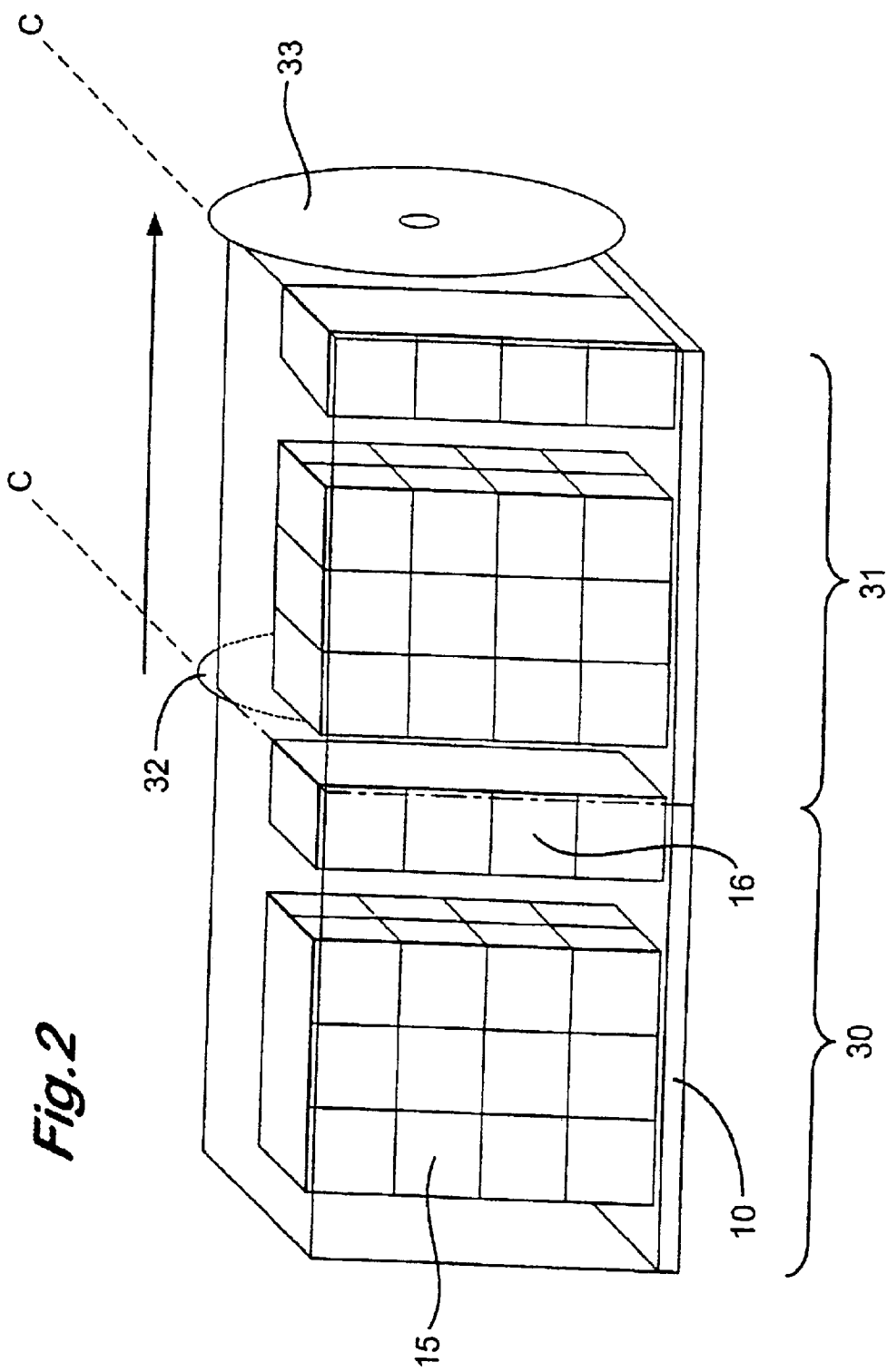

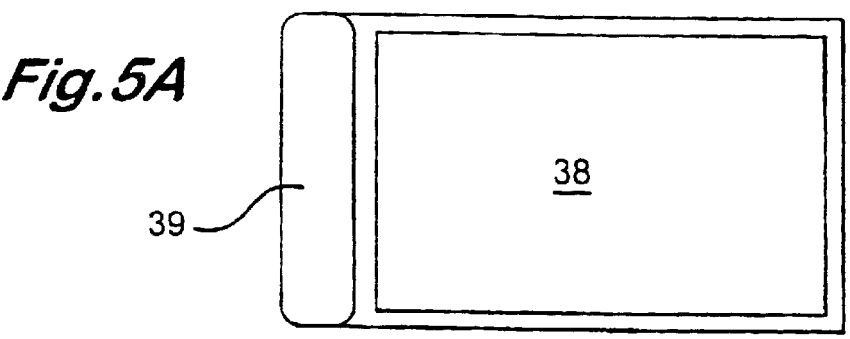
*Fig.5A*
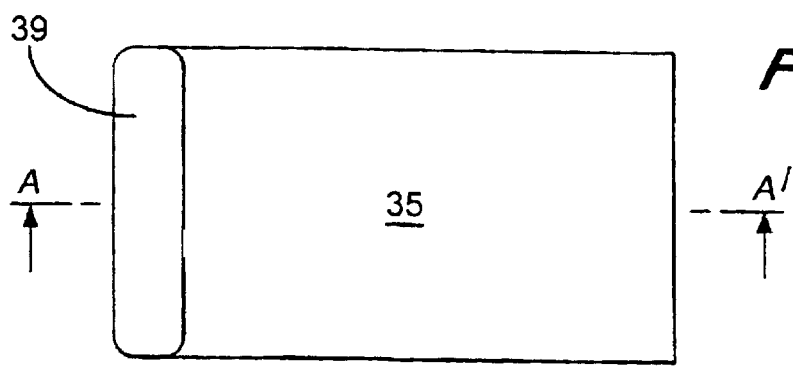
*Fig.5B*
*Fig.5C*
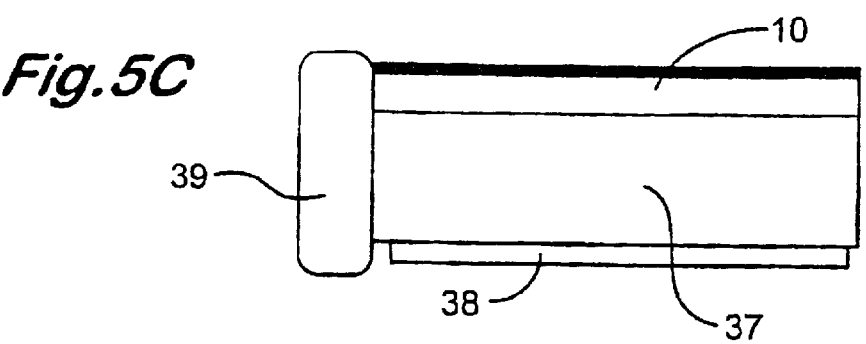
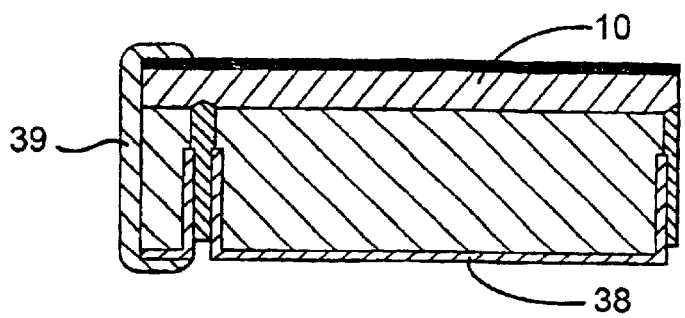
*Fig.5D*

SOLID STATE CAPACITORS AND METHODS OF MANUFACTURING THEM

BACKGROUND OF THE INVENTION

The present invention relates to the field of solid state capacitors. The invention particularly relates to capacitors of the type in which a powder-formed valve action metal forms a highly porous anode body portion of a capacitor, an electrically insulating dielectric layer is formed though the porous structure of the anode body, and a conducting cathode layer is formed on the dielectric layer and which is then electrically connected to a cathode terminal, the anode body being electrically connected to an anode terminal.

U.S. patent specification No. 5,357,399 (Salisbury) describes a method for simultaneously manufacturing multiple such capacitors from a porous tantalum layer sintered to a tantalum substrate. The layer is machined to form anode body portions of each capacitor. After processing a top plate (substrate lid) is bonded to the processed anode body top ends. The plate forms a lid which, after machining of the substrate/anode body/plate sandwich, becomes the cathode terminal of each capacitor. PCT application GB 99/03566 concerns a modified version of the Salisbury method in which the volumetric efficiency of the capacitors produced is optimized by removing the need for a substrate lid as the cathode terminal of each capacitor, thereby increasing the specific capacitive volume.

The foregoing methods permit the manufacture of very small but highly volume efficient capacitors. However the continued pressure of electronic circuit board design towards miniaturization of components and ease of assembly of such boards maintains a continued need for capacitors of improved volumetric efficiency and reduced component windows (or footprint) on the circuit board.

SUMMARY OF THE INVENTION

The present invention seeks to provide improved capacitors and improved methods of manufacturing such capacitors.

According to one aspect of the present invention there is provided a method of manufacturing a solid state capacitor comprising: providing an electrically conducting substrate; forming a plurality of upstanding porous electrically conducting anode bodies on a surface of the substrate, each body electrically connected to the substrate; forming an electrically insulating layer on the exposed surface area provided by the porous bodies; forming a conducting layer on the insulating layer; dividing the substrate into capacitor units, each comprising a portion of substrate provided with a porous capacitive body, and for each unit: providing a cathode terminal in electrical contact with the conducting layer on the capacitive body, providing an anode terminal in electrical contact with the substrate portion, characterized in that the cathode terminal is formed on a surface of the capacitive body distal to the substrate portion and the anode terminal is formed adjacent and substantially co-planar with the cathode terminal, an electrically conducting wick providing electrical contact between the substrate portion and the anode terminal, so that the capacitors have anode and cathode terminals on a common face.

By forming a capacitor with anode and cathode connections on a common face the footprint of the capacitor is minimized, whilst facilitating connection with a circuit board.

The electrically conducting wick may be formed by a process in which a plurality of upstanding electrically conducting wick bodies are formed on the surface of the substrate alongside the anode bodies, the substrate division producing capacitor units comprising a portion of substrate provided with both a porous capacitive body and a wick body, and wherein the anode terminal is formed on a surface of the wick body distal to the substrate portion.

In a preferred embodiment, the anode bodies are formed by configuration of a pre-form layer of porous conducting material applied to the surface of the substrate. Conveniently, the wick body is a porous conducting body, which may be formed by configuration of the pre-form layer.

By "configuration" the reader is intended to understand any shaping or forming process which can form the required bodies. Typical examples are cutting and machining, for example by saws or cutting wheels. However it may be that the worker may wish to employ laser cutting, water cutting, etching or other known methods to form the body shapes.

The wick bodies may be allowed to be provided with insulating and conducting layers along with the anode bodies. In this case an electrical connection through the insulating layer is provided by subsequent removal of the applied layers. This removal may be by machining, cutting, grinding, etching or the like, so long as the underlying conducting wick material is exposed.

In one embodiment of the invention, the dividing of the substrate preferably involves machining or cutting through a plane which passes through the wick bodies, thereby to expose un-coated wick material with which an anode terminal contact may be made. In this way no separate cutting process or machining is necessary to remove the insulating layers; it is included in the substrate division process.

In another embodiment the removal of insulating and conducting layers is carried out on a face of each wick distal to the substrate thereby to expose uncoated wick material with which an anode terminal contact may be made. This has the advantage of exposing a surface which is adjacent and co-planar the anode body top face, simplifying contact with the terminals.

A conductive material bridge may electrically connect the anode terminal and the exposed un-coated wick material. Typically the bridge material is applied as a conducting paste (e.g. silver paste) which sets to from a solid coating. To enhance the contact a carbon layer may first be applied.

In another aspect of the invention there is provided a state capacitor comprising a substrate portion and a capacitive body, which body comprises a porous anode body electrically connected to the substrate portion, an electrically insulating layer formed on the anode body surface area, and a conducting layer formed on the insulating layer, a surface of which capacitive body distal to the substrate portion is provided with a cathode terminal, characterized in that an anode terminal is provided adjacent and substantially co-planar with the cathode terminal, an electrically conducting wick providing electrical contact between the substrate portion and the anode terminal, thereby providing a capacitor having anode and cathode terminals on a common face.

In certain embodiments, in each capacitor, there are a plurality of anode terminals adjacent and substantially co-planar with the cathode terminal, each anode terminal electrically connected to the substrate by an associated wick. The wicks may each be formed form the same porous conducting material as the anode body.

According to another aspect of the invention there is provided a method of manufacturing multiple solid state capacitors comprising a method as hereinbefore described wherein a plurality of anode and wick bodies are formed on the substrate, and the substrate is divided to provide a plurality of individual capacitor units.

As the terminals are coplanar, the capacitor may stand on a flat surface with the cathode terminal and anode terminal contacting the flat surface. This makes the capacitor very well adapted for placement on and attachment to a circuit board.

The pre-form may be applied to the substrate by laying a green, unsintered mixture of valve action metal powder and binder/lubricant on the substrate. The green mixture may then be sintered to fuse the powder into a solid highly porous pre-form, the binder/lubricant being burnt off during sintering.

The pre-form layer maybe machined to form the anode bodies and the wick bodies. Typically longitudinal and lateral grinding cuts may be employed in order to produce an array of rectilinear anode and wick bodies on the substrate, separated by "streets" corresponding to the path of the grinding cut. Naturally more complex shapes can be produced by conventional machining techniques, as required.

The processing is facilitated if both wick and anode bodies are coated with the insulating layer and the conducting cathode layer. An alternative would be to mask the wick bodies in order to prevent coating of the anode bodies from, but this would be a rather difficult and more complicated process.

The insulating layer may be a dielectric layer of an oxide of the valve action material, applied for example by conventional anodization techniques in order to build up gradually an oxide of the required thickness and integrity. In on example, in which the valve action layer is tantalum, a layer of tantalum pentoxide is built up on the bodies.

The conducting layer may be applied by dipping of the anode and wick bodies into a precursor solution of, for example manganese nitrate solution. The layer of manganese nitrate formed on the bodies may be heated to oxidize the nitrate to manganese dioxide. Repeated dipping steps may be necessary in order to build-up the optimum cathode layer.

Building-up of the conducting or "cathode" layer completes the formation of the anode body into a capacitive body.

In the case where both the anode bodies and wick bodies are subject to the application of an insulating layer and a cathode layer it is necessary to isolate electrically the cathode layer material on the anode bodies from that on the wick bodies, in order to prevent a short circuit in the final capacitors. This may involve removal of all cathode layer material bridging the anode and wick bodies. Typically this may be achieved by a grinding cut through the conducting layer, and inevitably through the insulating layer also. In this case a replacement electrically insulating layer may be formed on any exposed surfaces revealed by cathode layer removal. This process is known as reformation. Again this may be conducted by a re-anodization process.

As well as isolating the conducting layers of the respective anode bodies and wick bodies one from another, it is necessary to remove conducting layer and insulating layer material from those parts of the wick bodies which are to contact or form the anode terminals, so that an electrical connection to the valve-action substrate material may be made. Removal of the layers may be by machining, for example grinding. In one example grinding cuts are made along a top surface of each wick body, thereby exposing valve action material. The top surface may then be subjected to a termination process to form the anode terminal. Typically this involves application of a first layer of conducting carbon paste which is then cured. Next a second layer of conducting silver paste is applied, and cured. Finally a solder-facilitating tri-alloy layer, or the like, may be applied to enable a good soldered contact to be made. A similar termination process is also carried out on a top surface of the capacitive body, in which carbon and silver layers are formed on the conducting cathode layer of the top surface, optional followed by application of a tri-alloy layer. These conducting layers provide a terminal for electrical connection, by for example soldering, to an electrical or electronic circuit.

In the un-divided substrate, the spaces between the anode bodies and the cathode bodies may be filled with an insulating material, for example a liquid plastics resin which solidifies to form a protective encapsulation of the bodies. Naturally the resin should leave the upper surface of the capacitive and wick bodies exposed, by masking if necessary. Other wise removal of the resin layer back to expose these faces is required.

The next step which must be carried out is separation of the or each capacitor unit from the bulk substrate. This may be achieved by machining by for example a grinding cut. If necessary a rigid backing support may be provided for the substrate to as to provide the necessary structural rigidity to permit cutting without damaging the capacitors.

In another aspect of the invention the dividing comprises cutting along a plane or path which intersects with one or more wick bodies, thereby to cut through or remove conducting layer material and insulating layer material applied to the wick, and to expose a cut surface of uncoated wick body. Preferably the wick bodies may be arranged on the substrate in rows, and the dividing comprises cutting along one or more of the rows.

The cutting plane preferably intersects with a wick body surface region distal from the associated anode body of the capacitor unit to be divided.

The cutting is preferably carried out through a plane or planes perpendicular or substantially perpendicular to the plane of the substrate. The cutting may comprise grinding, but could also include water cutting or other cutting methods.

The terminal may be provided on the expose cut surface of the wick body by a termination process comprising liquid coating of that surface by a conducting paste, and allowing the coating to solidify. The termination processes may further comprise electroplating the solidified coating to form a layer of metallic material on the respective body or bodies.

Preferably, before dividing, the substrate is coated with a protective insulating material which infiltrates in between the anode and wick bodies, and wherein the dividing process comprises cutting along the protective material, thereby to leave a sidewall of protective material around each anode and cathode body of each cathode portion, the wall being absent in the said side regions of the anode bodies which intersect with the cut.

The protective material may be a resin material which is infiltrated as a liquid and subsequently allowed to set.

A termination layer of metal plate may be applied, for example by electrodeposition. Typically a layer of nickel and tin/lead or gold is applied. This provides a solder compatible surface for electrical connection.

Following is a description by way of example only and with reference to the accompanying drawings of methods of putting the present invention into effect.

BRIEF DESCRIPTION OF THE SEVERAL VIEWS OF THE DRAWINGS

In the drawings:

FIG. 1 is a plan view of a portion of a substrate to be processed according to one embodiment of the present invention.

FIG. 2 is a perspective view of a small area of the substrate portion shown in FIG. 1.

FIGS. 5A, 5B, 5C and 5D show, respectively, underside, top face, side view and sectional views of a finished capacitor according to one embodiment of the present invention.

Figure 7A:
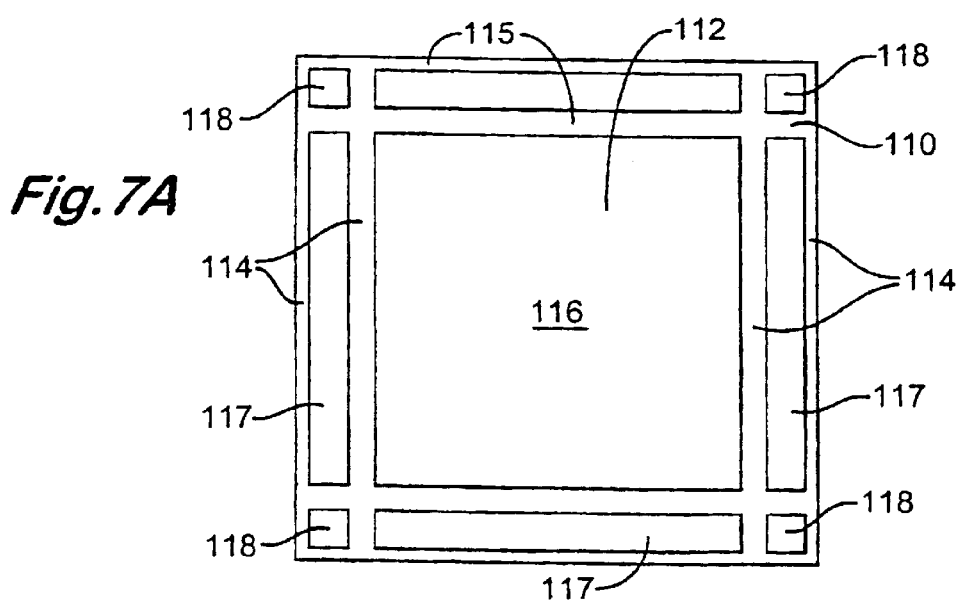
FIGS. 7 to 13 illustrate schematically a process according to the present invention.
Figure 7B:
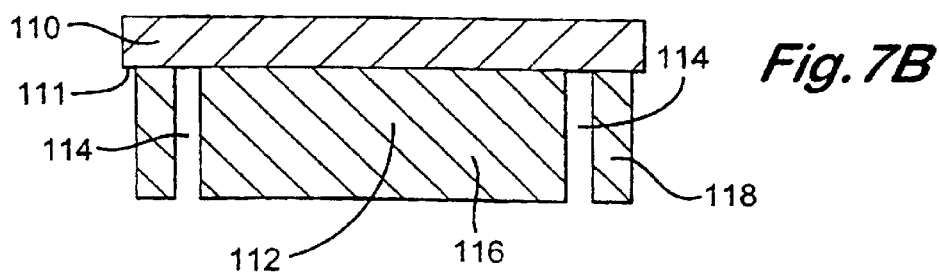

In particular:

FIG. 7A is a plan view of a tantalum substrate having anode bodies and a cathode body formed thereon. FIG. 7B is a side view of the same substrate.

Figure 8A:
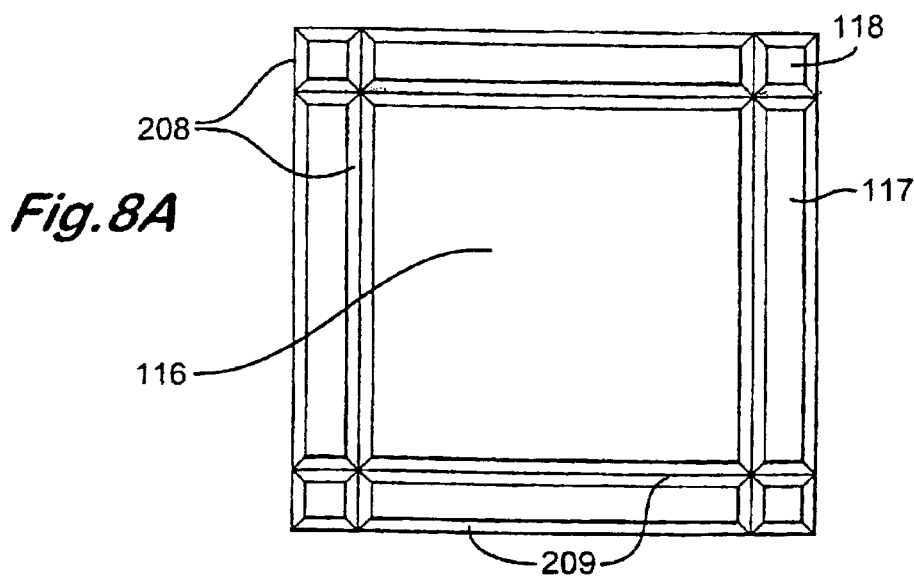
Figure 8B:
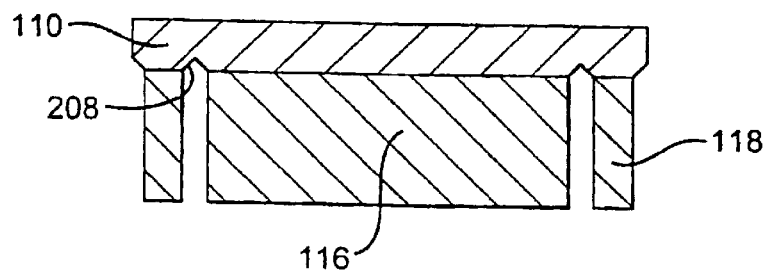

FIGS. 8A & 8B show isolation of the cathode body from the anode body.

Figure 9A:
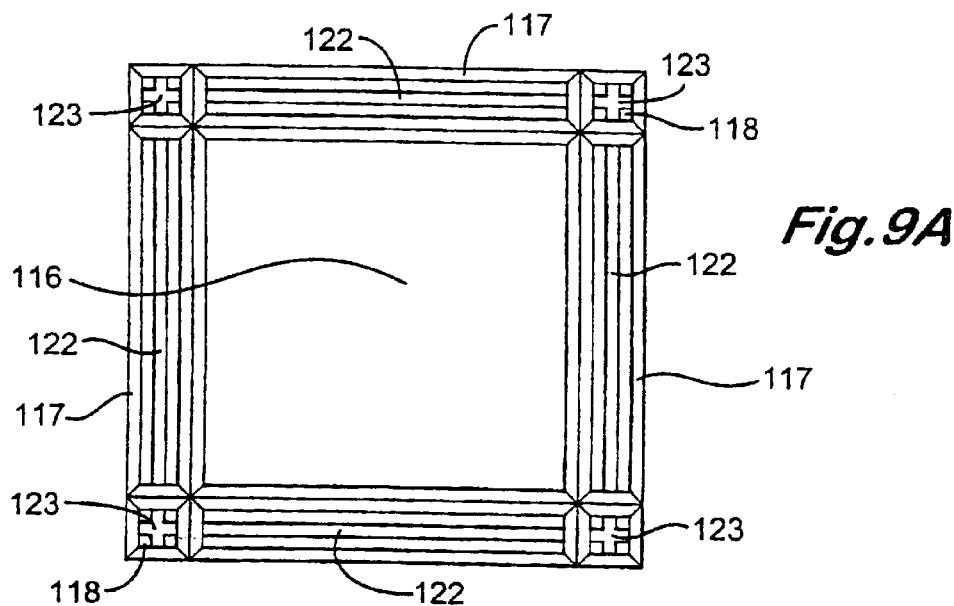
Figure 9B:
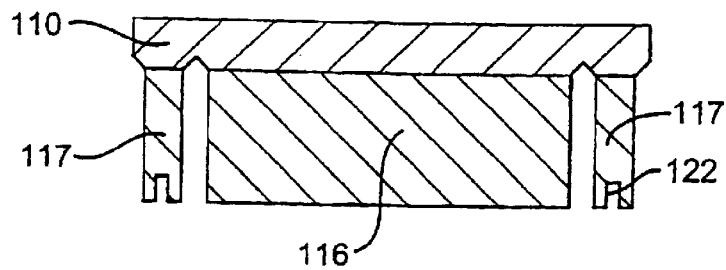

FIGS. 9A & 9B show the formation of anode terminal connections through the anode bodies.

Figure 10A:
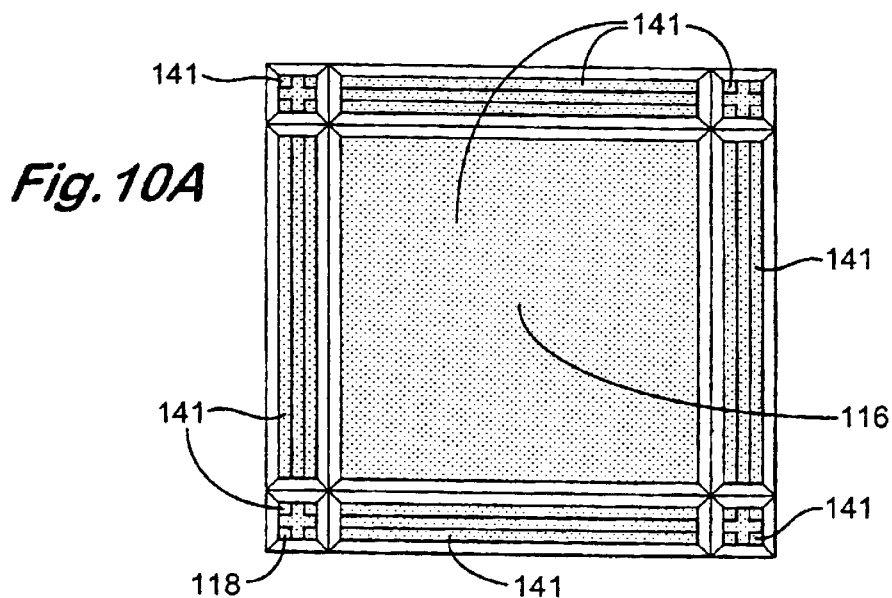
Figure 10B:
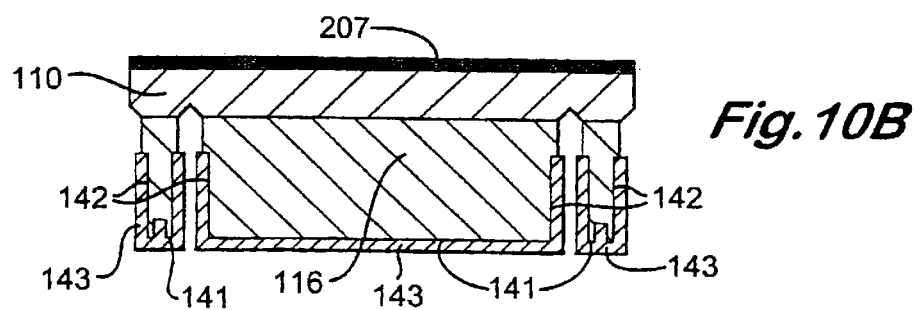

FIGS. 10A & 10B show the termination process.

Figure 11A:
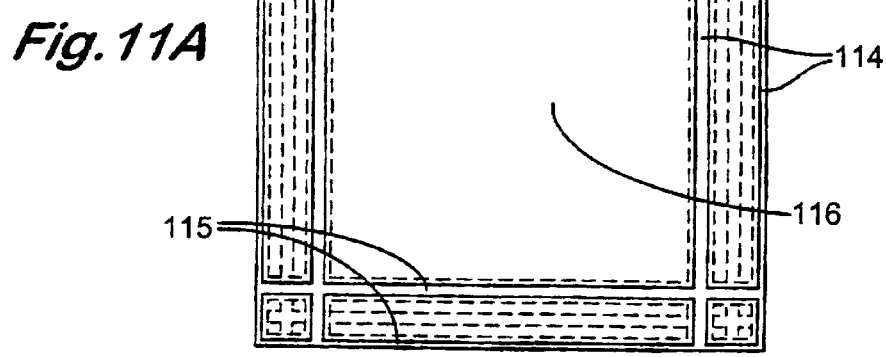
Figure 11B:
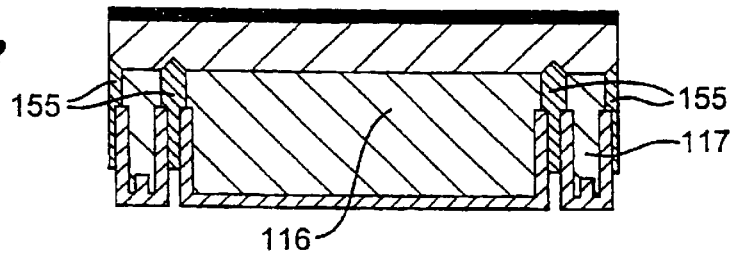

FIGS. 11A & 11B show an encapsulation process.

Figure 12A:
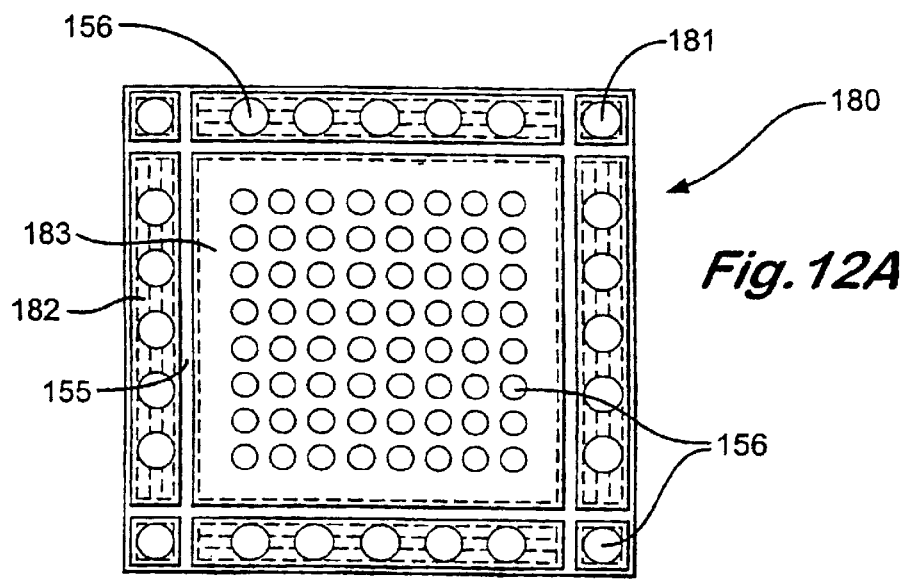
Figure 12B:
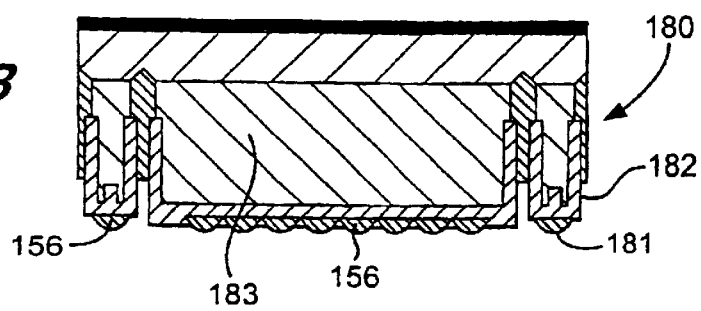

FIGS. 12A & 12B show a final step in the termination process.

Figure 13:
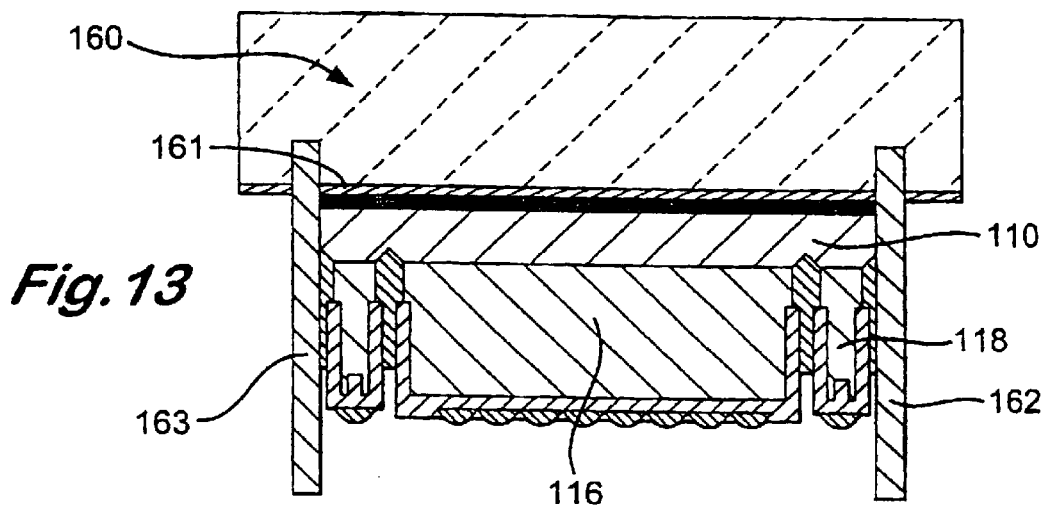

FIG. 13 shows a cutting process for separating individual capacitors.

Figure 14A:
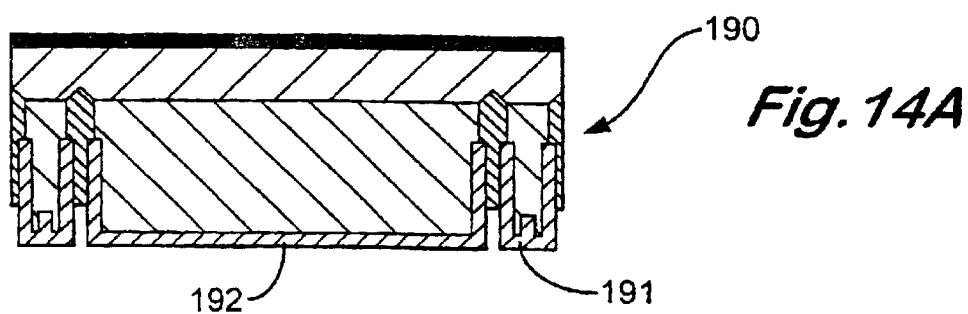
FIGS. 14 and 15 show individual capacitors produced by the method.
Figure 14B:
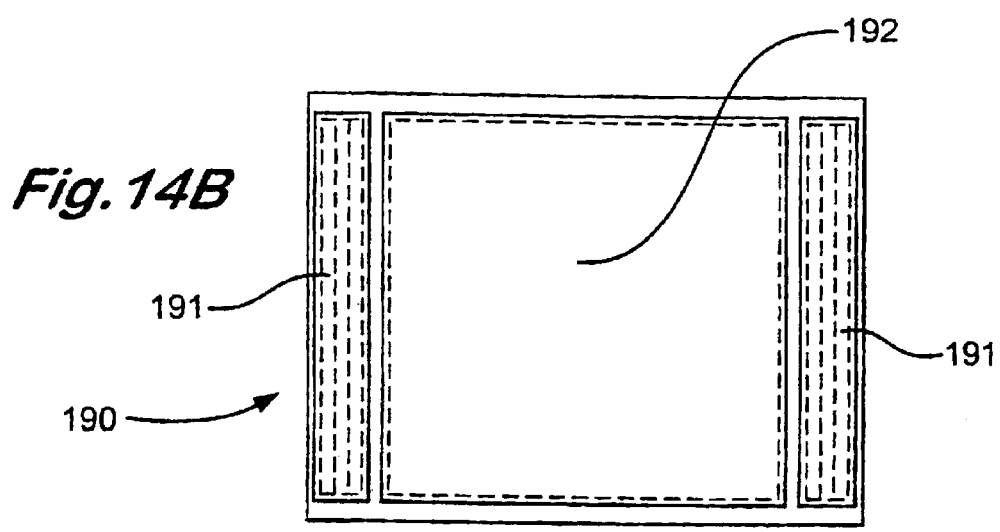

FIGS. 14A & 14B show one example of a capacitor produced by the method of the present invention.

Figure 15A:
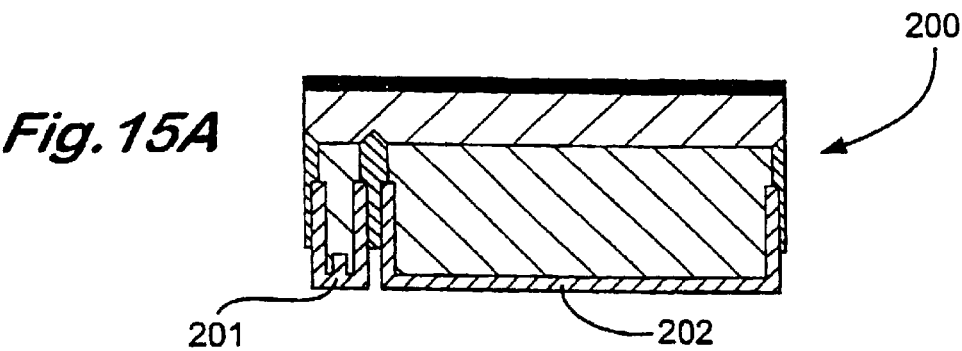
Figure 15B:
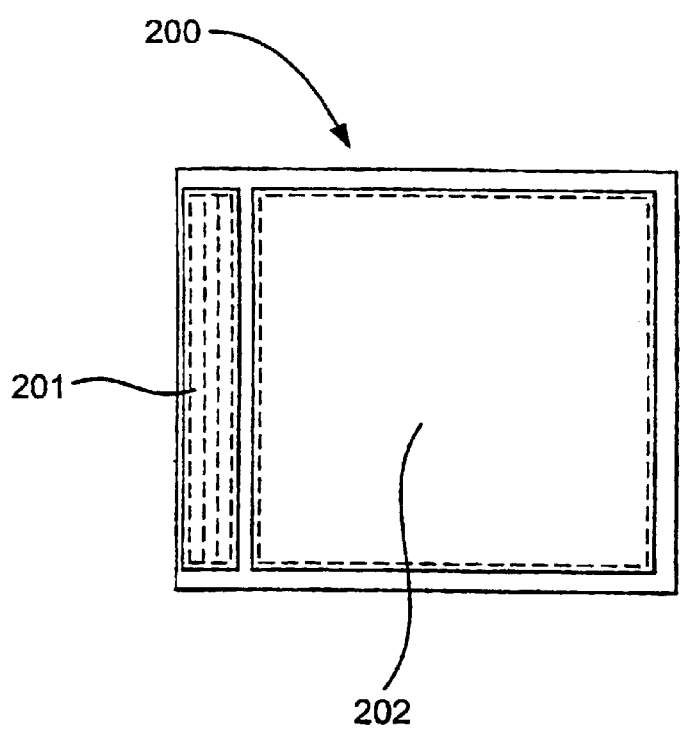

FIGS. 15A & 15B show a second example of a capacitor according to the present invention.

DETAILED DESCRIPTION OF THE INVENTION

First embodiment of a method according to the invention. A solid substrate of, for example, 0.25 mm thick tantalum wafer 10 is shown in FIG. 1. A top surface 9 of the substrate is covered with a dispersion of tantalum grains (not shown). The grains are fused to the tantalum wafer by sintering, thereby to form a seed layer (not shown). A conventional mixture of tantalum powder and binder/lubricant is then pressed onto the seed layer. The seed layer provides mechanical keying and enhances the bond between the green (un-sintered) powder and the substrate. The green powder mixture is then sintered to form an inter-connected, highly porous matrix of fused tantalum powder particles. The binder is burned off during the sintering process. This leaves a uniform layer of porous tantalum on the solid wafer.

The porous layer mixture is machined to form an orthogonal pattern of channels in rows 11 and columns 12. The rows are machined in closely spaced parallel pairs 13,14 so that an array of generally square 15 and oblong 16 bodies are formed on the substrate, as shown in the figure. The square bodies 15 will form the capacitive bodies in the final capacitors, so are termed capacitive bodies hereafter. The oblong bodies 16 will form the anode terminal wicks.

The substrate and its array of upstanding bodies 15,16 is then subjected to a conventional anodization treatment which forms a thin dielectric layer of tantalum pentoxide on the tantalum of the substrate and through the porous network of the powder-formed bodies. Anodization may be repeated several times in order to build-up the required depth and integrity of dielectric layer. The dielectric layer forms an electrically insulating layer for providing capacitance in the final devices.

Next the substrate 10 and bodies 15,16 are coated with a cathode layer-forming solution of manganese nitrate. The solution enters into the porous network to form a manganese nitrate layer on the dielectric layer. The manganese nitrate is heated in an oxygen-containing atmosphere that oxidizes the manganese nitrate, forming manganese dioxide. The coating and heating process may be repeated in order to build up the required conductive. The manganese dioxide layer is electrically conducting and provides a layer providing electrical contact with a cathode terminal in the final capacitors.

The coated capacitive bodies 15 and wick 16 must now be isolated from one another so that capacitor unit pairs of bodies do not short circuit in the final capacitors. The wick bodies are isolated from the capacitive bodies by means of fine grinding cuts. The cuts run along the rows 13 to form grooves indicated by the lines 20 in FIG. 1. These cuts impinge into the underlying substrate, thereby passing through both the manganese oxide cathode layer and the tantalum pentoxide dielectric layer. Once the wick and capacitive bodies have been isolated, the anodization process is repeated in order to form a protective tantalum pentoxide layer on the exposed tantalum of the isolation groove cuts.

Respective layers of carbon and silver paste (not shown) are applied to the top ends of the bodies, and extending about ⅔ of the way down the sidewalls of each. This layer provides a good electrical contact for the formation of terminals on the final capacitors.

An epoxy resin liquid is infiltrated into the rows and columns to occupy the space in between bodies on the substrate. A lid (not shown) is placed on the body top ends in order to constrain the resin to below the top ends of the bodies. The resin is allowed to set, and the lid layer removed.

The substrate is now divided to provide a plurality of individual capacitor units. The division is conducted by means of a fine grinding wheel. Each column cut follows along the center line of each column 12, through a plane perpendicular to the plane occupied by the substrate. Each row cut follows a direction parallel to the oblong bodies, offset to the side of the row 14 so that the cut impinges on each sidewall of the wick bodies 16 along that row. The path of the respective row cuts is shown by the dotted line C in FIG. 1. Because the cut impinges on the wick sidewall, the manganese oxide and dielectric layer are ground away to expose the metal porous matrix of the body.

Figure 3A:
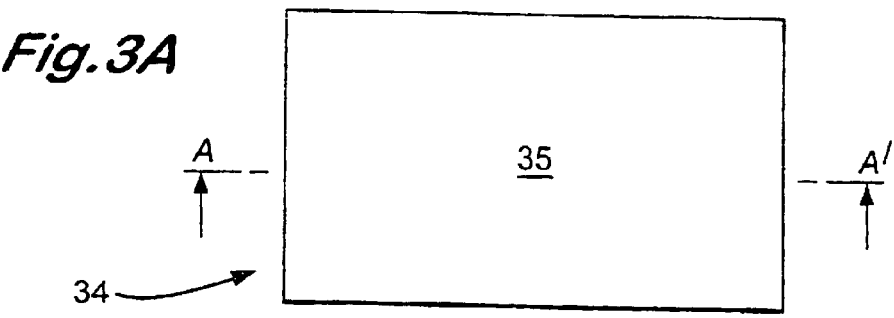
FIGS. 3A, 3B and 4A, 4B show an unfinished and finished capacitor made according to the present invention.
Figure 3B:
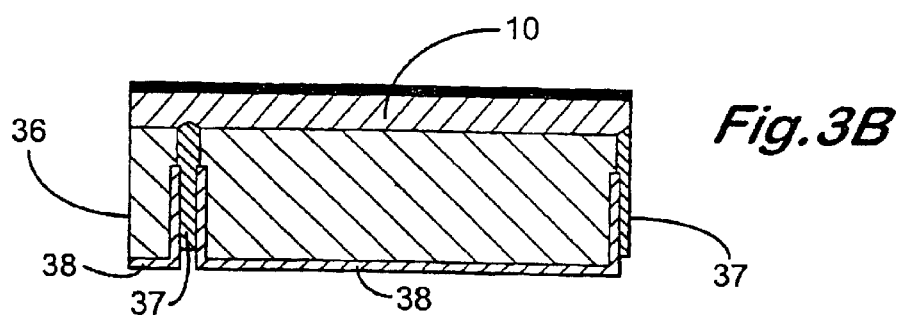
Figure 4A:
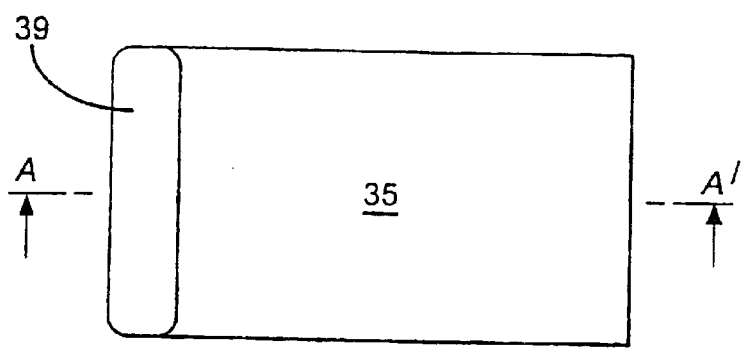
Figure 4B:
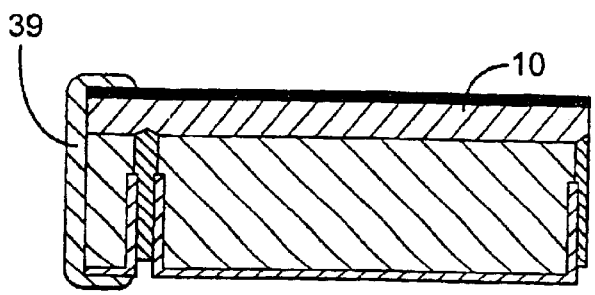
Figure 6A:
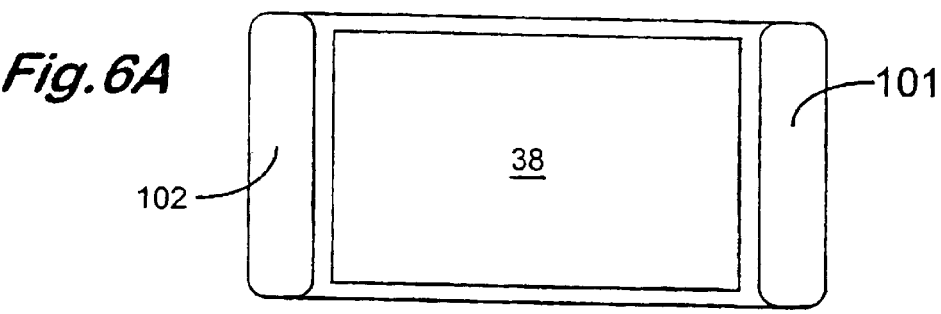
FIGS. 6A, 6B, 6C and 6D show, respectively, underside, top face, side view and sectional views of a finished capacitor according to another embodiment of the present invention.
Figure 6B:
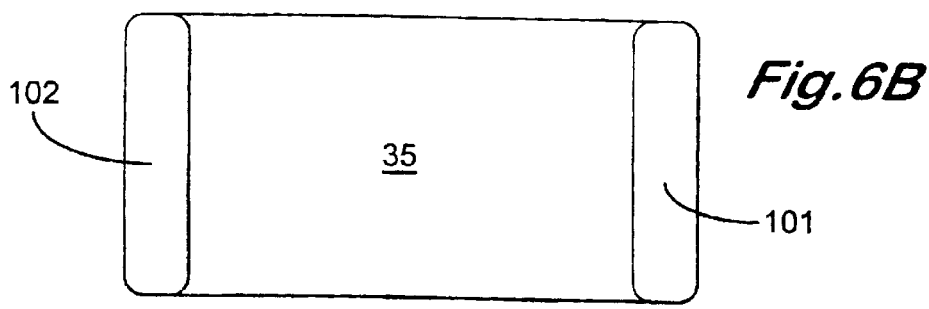
Figure 6C:
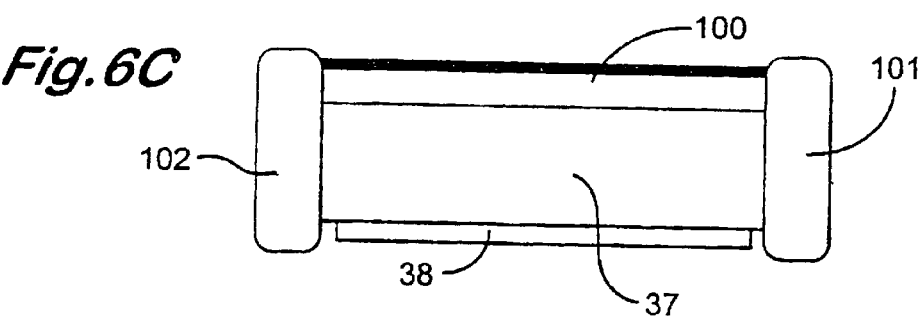
Figure 6D:
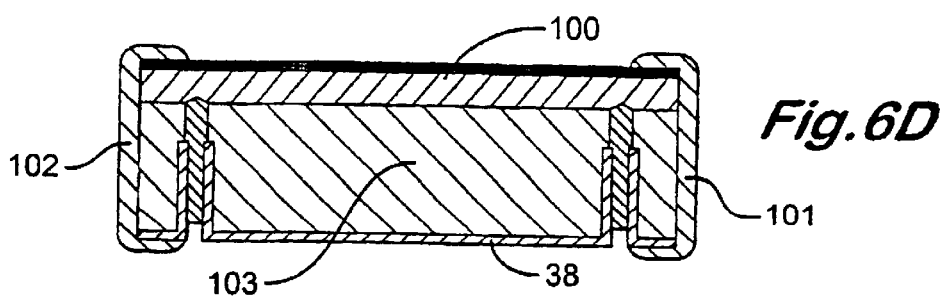

The cutting process is shown in more detail in FIG. 2, which shows two capacitor units 30 and 31. The column cuts have already been made. The two dicing wheels 32,33 are shown moving through the cutting path C, about to impinge on the outside wall of each anode body 16. Once cutting is complete, a plurality of unfinished capacitor units is left, one of which 34 is shown in FIG. 3. FIG. 3A is a top view of the unfinished capacitor, simply showing the diced substrate portion 35 of the capacitor. FIG. 3B is a sectional side view along the line AA'. The exposed wick sidewall face 36 is on the left hand side of the figure. The capacitive body is surrounded by a sleeve of resin material 37. Each body is shown with the silver and carbon paste layers 38. The exposed face 36 is dipped into a liquid silver paste to coat the face and local region of the capacitor with an end cap 39, as shown in FIG. 4A and 4B. By coating onto exposed tantalum metal an extremely good electrical contact is made, preferably overlapping with the substrate to provide direct contact therewith. In addition to a direct electrical contact is made with the substrate layer, so enhancing the electrical contact with the metal matrix of the cathode body in the bulk of the capacitor.

In order to finish the capacitor a metal plate layer may be applied to the exposed surfaces 39,38 of the respective anode terminal (wick) and cathode terminal (capacitive body). This can be applied by known methods such as electro-deposition and sputter coating. In a preferred arrangement a layer of nickel is applied followed by a tin-lead layer. The metal plate layer provides a solder compatible surface permitting soldering of the component to a printed circuit board. FIG. 5 shows the final capacitor.

FIG. 6 shows an alternative capacitor 100 according to the present invention. Each capacitor portion of the substrate is formed with two wick bodies 101,102. In between these two is a capacitive body 103. It will be appreciated that the alteration to the process will involve forming thicker wick bodies. The dicing cut is directed along the centre line of each wick body so that each body is divided in two. One half becomes a first wick body of one capacitor unit, and the other becoming the first wick body of another capacitor unit. Second wick bodies are formed similarly at the opposite ends of each capacitor unit.

The result is a capacitor having the structure shown in FIG. 6, with two anode terminals 105 and a central face cathode terminal 106.

Second embodiment of a method according to the present invention.

A solid substrate of, for example, 0.25 mm thick tantalum wafer is provided. One surface of the substrate is covered with a dispersion of tantalum grains. The grains are fused to the tantalum plate by sintering to form a seed layer. A conventional mixture of tantalum powder and binder/lubricant is then pressed onto the seed layer. The seed layer provides a mechanical keying and enhances the bond between the green (unsintered) powder and the substrate. The green powder mixture is then sintered to form an inter-connecting highly porous matrix of fused tantalum powder particles. The binder is burned off during the sintering process. Leaving a pre-form layer of sintered tantalum fused to the tantalum substrate.

FIGS. 7A and 7B show further machining processing applied to the pre-form layer. For the sake of clarity the processing of a single capacitor is shown. In practice a plurality of capacitors will be processed simultaneously on a single tantalum substrate. The porous pre-form layer 112 has been fused to a surface 111 of the substrate 110. The porous layer is now machined to form a plurality of vertical 114 and horizontal 115 slots in the porous layer. The slots define a network of square-plan capacitive bodies (one only shown as 116) upstanding on the substrate base. The slots also form four elongate rectangular plan wick bodies 117 along each side of the lands. At each corner of the capacitive bodies a square-plan wick feature 118 is formed.

The substrate and its network of upstanding bodies and is then subjected to a conventional anodization treatment which forms a thin dielectric layer of tantalum pentoxide on the tantalum of the substrate and through the porous network of the powder-formed layer. Anodization may be repeated several times in order to build-up the required depth and integrity of dielectric layer. The dielectric layer forms an electrically insulating layer for providing capacitance in the final devices.

Next the porous layer is coated, by repeated dipping, with a cathode layer forming solution of manganese nitrate. The solution enters into the porous network to form a manganese nitrate layer on the dielectric layer. The manganese nitrate is heated in an oxygen-containing atmosphere that oxidizes the manganese nitrate, forming manganese dioxide. The coating and heating process may be repeated in order to build up the required layer. The manganese dioxide layer is electrically conducting and provides a cathode layer for electrical connection to a cathode terminal.

The coated capacitive bodies 116 and wick bodies 117, 118 must now be isolated from one another. The wick bodies are isolated from the cathode features by means fine grinding cuts. The cuts run along the horizontal and vertical slots 114 & 115 to form vertical isolation cuts 208 and horizontal isolation cuts 209. These cuts impinge into the underlying substrate as shown in FIG. 8B, thereby passing through both the manganese oxide cathode layer and the tantalum pentoxide dielectric layer. Once the respective wick and capacitive bodies have been isolated, the anodization process is repeated in order to form a protective tantalum pentoxide layer on the exposed tantalum of the isolation cuts.

Next horizontal and vertical cuts are made into and along the distal top ends of the wick bodies 117 & 118, as shown in FIGS. 9A & 9B. These cuts to form elongate slots 122 in the top end of the rectangular wick features 117 and crossed slots 123 on the top end of the square wick features 118. These lots cut through both the manganese oxide cathode layer and the dielectric layer form on the anode bodies, thereby permitting electrical connection to the porous metal interior of the wick bodies.

The next stage of the process concerns the formation of terminals of each capacitor (i.e. the termination process). First a conducting carbon paste layer (not shown) is deposited on end regions 141 and upper side regions 142 of each capacitive and wick body. The carbon layer is allowed to harden by curing. Second a conducting silver paste layer 143 is deposited on the carbon layer, and itself allowed to cure.

An optional conductive plating may be applied onto the top free surface 207 of the substrate 110 in order to provide an alternative anode terminal on the substrate free surface. The conductive layer may be a sputtered tri-metal system, to aid soldered connection to a circuit.

FIGS. 11A and 11B show an encapsulation process. The slots 114,115 between capacitive 116 and wick bodies are filled with an electrically insulating resin 155. Initially a removable masking layer (not shown) is applied to the silvered end regions of the anode and cathode bodies in order to shield them from unwanted contamination by resin. Liquid resin 155 is injected into the slots in order to encapsulate the sides of the anode and cathode features. The resin is permitted to solidify. The masking layer is removed to expose the silvered upper ends of each anode and cathode feature. Other encapsulation techniques may be used, including fluidized bed powder filling, flip chip underfill resin technology and simple liquid resin dispensing into the slots. Each of these techniques is within the common general knowledge of the skilled person.

The silvered exposed surfaces are provided with further processing to facilitate electrical connection with an electrical circuit or attachment to a circuit board, as shown in FIGS. 12A and 12B. Specifically, an array of silver bumps 156 is applied to the exposed surface of the anode bodies and the cathode bodies. These raised bump features provide contact points which may readily fuse with solder to form an electrical connection to an electronic or electrical circuit in which the capacitor is integrated.

FIG. 13 shows a sectional side view through a capacitor, illustrating the separation of the individual capacitor by division of the bulk substrate. The substrate 110 is attached to a glass plate 160 by means of a suitable adhesive or alternatively mounted by means of a UV releasable adhesive tape 161. Cutting wheels 162 and 163 are used to cut through the resin channels separating individual capacitors. The cut continues through the substrate, through any adhesive tape and, if necessary, into the glass base 160 so as to ensure a clean cut. Horizontal and vertical cuts are combined to produce a grid of cuts which separate each individual capacitor (only one capacitor from the array is shown). The capacitors may be released from the glass plate by degradation of the adhesive in the case of an adhesive mounting, or by exposure of the plate to ultra violet light. The UV light degrades the adhesive layer on the tape so that the capacitors may be detached from the backing tape.

FIGS. 14A, 14B, 15A, and 15B each show examples of alternative configurations for capacitors produced by methods generally in accordance with the foregoing.

EXAMPLE 1

In FIGS. 14A & 14B a capacitor 190 is shown having two elongate rectangular plan anode terminals 191. There is a central cathode terminal pad 192. The terminals left clean of silver paste electrical connection bumps. This configuration is produced by reducing the number of grinding cuts applied to the porous pre-form on the substrate during initial machining.

EXAMPLE 2

In FIGS. 15A & 15B a capacitor 200 is shown having one elongate anode terminal 201 and one central square plan cathode terminal pad 202. Again, this configuration is readily obtained by reducing the number of grinding cuts carried out on the porous preform applied to the substrate during initial machining, as compared to example 1 above. This particular capacitor is shown without the optional silver contact bumps.

Typical production specifications for capacitors produced by the methods of this invention are varied but, for example, the method can be used to produce low-profile capacitors having dimensions of 10×10×1 mm, using a substrate of 0.25 mm tantalum, a seed layer of 0.25 g KTA tantalum powder, a pre-form press height of 0.95 mm, using S700 tantalum powder and a press density of 5.5 g/cc and a forming ratio of 4:1. The typical electrical specifications are 470 micro farads for 10 volts rated capacitors, $L_i$ being about 5 micro-amps.

What is claimed is:

1. A method of manufacturing solid state capacitors comprising:

providing an electrically conducting substrate;
providing a pre-form layer of porous conducting material applied to a surface of the substrate, forming a plurality of upstanding porous electrically conducting anode bodies and wick bodies by configuring of the pre-form, each body electrically connected to the substrate;
forming an electrically insulating layer on the exposed surface area provided by the porous anode bodies;
forming a conducting layer on the insulating layer on the anode bodies;
dividing the substrate into capacitor units, each comprising a portion of substrate provided with a porous capacitive body and a wick body, and for each unit:
providing a cathode terminal in electrical contact with the conducting layer on the capacitive body, providing an anode terminal in electrical contact with the substrate portion,
wherein the cathode terminal is formed on a surface of the capacitive body distal to the substrate portion and the anode terminal is formed on a distal surface of the wick body which anode terminal is adjacent and substantially co-planar with the cathode terminal, with the electrically conducting wick body providing electrical contact between the substrate portion and the anode terminal, so that the capacitors have anode and cathode terminals on a common face.

2. A method as claimed in claim 1 wherein the wick bodies are allowed to be provided with insulating and conducting layers along with the anode bodies, and wherein an electrical connection through the insulating layer is provided by subsequent removal of the applied layers.

3. A method as claimed in claim 2 wherein the dividing of the substrate involves machining or cutting through a plane which passes through the wick bodies, thereby to expose un-coated wick material with which an anode terminal contact may be made.

4. A method as claimed in claim 2 wherein the removal of layers is carried out on a face of each wick distal to the substrate thereby to expose uncoated wick material with which an anode terminal contact may be made.

5. A method as claimed in claim 3 or claim 4 wherein a conductive material bridge electrically connects the anode terminal and the unexposed un-coated wick material.

6. A solid state capacitor comprising a substrate portion and a capacitive body, which body comprises a porous anode body electrically connected to the substrate portion, an electrically insulating layer formed on the anode body surface area, and a conducting layer formed on the insulating layer, a surface of which capacitive body distal to the substrate portion is provided with a cathode terminal, characterized in that an anode terminal is provided adjacent and substantially co-planar with the cathode terminal, an electrically conducting wick providing electrical contact between the substrate portion and the anode terminal, thereby providing a capacitor having anode and cathode terminals on a common face, and wherein the wick is formed from the same porous conducting material as the anode body.

7. A capacitor, or method of forming capacitors, as claimed in one of claims 1, 2, 3, 4 or 6 wherein in each capacitor there are a plurality of anode terminals adjacent and substantially co-planar with the cathode terminal, each anode terminal electrically connected to the substrate by an associated wick.

* * * * *